MAGNETIC FREQUENCY CHANGER

Filed Feb. 2, 1966 4 Sheets-Sheet 1

INVENTOR.
Hiroshi Kobayashi
Kiyoshi Hisano
Eijiro Miyazawa
BY
Wenderoth, Lind & Ponack, attys.

INVENTOR.
Hiroshi Kobayashi
Kiyoshi Hisano
Eijiro Miyazawa
BY
Wenderoth, Lind & Ponack, attys INVENTOR.
Hiroshi Kobayashi
Kiyoshi Hisano
Eijiro Miyazawa
BY
Wenderoth, Lind & Ponack, attys INVENTOR.
Hiroshi Kobayashi
Kiyoshi Hisano
Eijiro Miyazawa BY Wenderoth, Lind & Ponack
Attys United States Patent Office 3,393,356

Patented July 16, 1968

3,393,356

MAGNETIC FREQUENCY CHANGER

Hiroshi Kobayashi, Kodaira, Tokyo, Kiyoshi Hisano, Tokyo, and Eijiro Miyazawa, Mitaka, Tokyo, Japan, assignors to Yawata Iron & Steel Co., Ltd., Tokyo, Japan Filed Feb. 2, 1966, Ser. No. 524,610

Claims priority, application Japan, Feb. 5, 1965, 40/5,991

1 Claim. (Cl. 321—68)

ABSTRACT OF THE DISCLOSURE

A three-phase parallel type ferro-resonance frequency multiplier device which consists of at least one linear reactor, a three-phase saturable reactor and a three-phase capacitor, said three-phase saturable reactor being composed of three sets of $n$ saturable reactor exciting windings and $n$ common magnetic cores, the corresponding exciting windings of each phase being wound on a common magnetic core and the $n$ exciting windings of each phase being connected in series, the three sets of series connected exciting windings being connected in three-phase relationship, and $n$ output windings being connected in three-phase relationship, and $n$ output windings, one on each common core, and being connected in series with every other output winding being in reverse polarity, whereby there is generated between output terminals of said series of output windings a single-phase voltage having a frequency $n$ times the frequency of an input voltage to said device, one end of each set of series connected saturable reactors exciting windings being connected in parallel to a corresponding phase of said three-phase capacitor, a three-phase filter having three input terminals, said three-phase saturable reactor being connected in parallel to the input terminals of said three-phase filter, each phase of said filter being composed of a series connected circuit of a linear reactor and a capacitor and which resonates at the third harmonics of the source frequency, the neutral point of said three-phase filter and the neutral point of said three-phase saturable reactor being electrically unconnected.

The inventors of the present invention have already invented various three-phase parallel type ferro-resonance devices to cause the value of three-phase alternating current voltage to be constant independent of the variation of electric source voltage and of load current. However, in the devices already developed, as described below, there is occasionally induced a low frequency oscillation voltage as low as several cycles per second if the electric source voltage rises, occasionally causing faults which impair the functioning of the devices. The present invention relates to a novel three-phase parallel type ferro-resonance device having an improvement that can remove those faults.

In the drawings, FIGS. 1*a*–*d* are circuit diagrams of a three-phase parallel type ferro-resonance device already developed, respectively.

FIGS. 2*a* and 2*b* show the C part of the device of FIGS. 1*a*–1*d*, that is connection diagrams of a three-phase capacitor, respectively.

FIGS. 3*a*–3*i* show the SR part of the devices of FIGS. 1*a*–1*d*, that is, connection diagrams of a three-phase saturable reactor, respectively.

Figure 7:
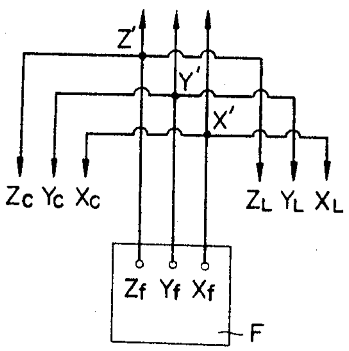
FIG. 7 shows a circuit diagram of an embodiment of the present invention (F is a three-phase filter).
Figure 8:
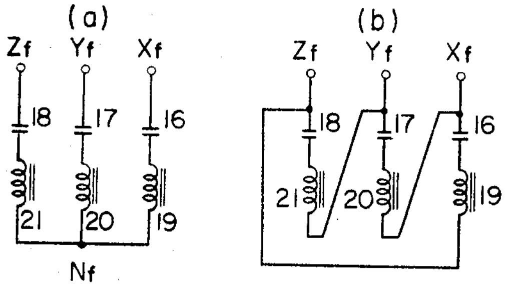

FIGS. 8*a* and 8*b* show connection diagrams of a three-phase filter of FIG. 7, respectively.

Figure 9:
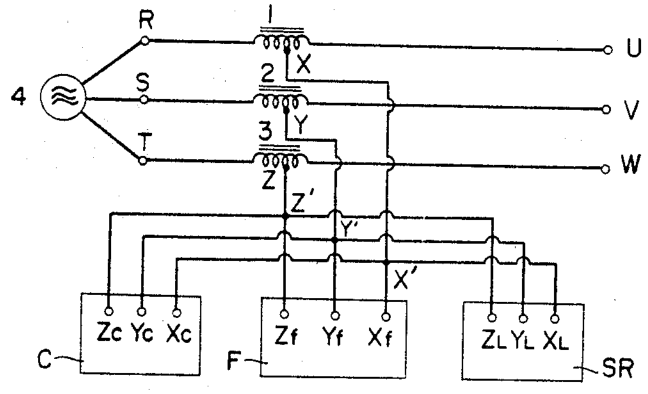

FIG. 9 shows a more complete circuit of the embodiment shown in FIG. 7.

Figure 10:
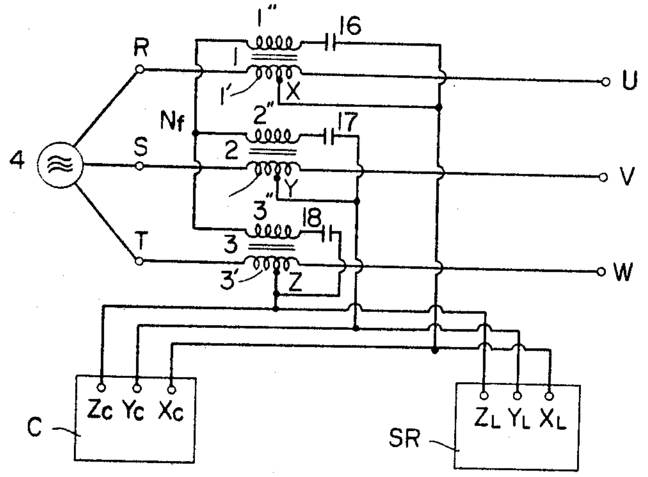

FIG. 10 shows a circuit diagram of another embodiment of the present invention.

Figure 1A:
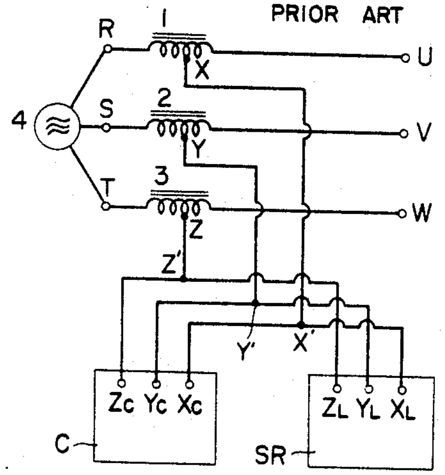
FIG. 1a PRIOR ART

In FIGS. 1*a*–1*d*, which show the circuit diagrams of the three-phase parallel type ferro-resonance device already developed by the present inventors, the circuit shown in FIG. 1*a* supplies electric power from a three-phase alternating current source to a three-phase load. In the figure 1, 2 and 3 are linear reactors, 4 is a three-phase alternating current source, R, S and T are terminals of the electric source, U, V and W are output terminals to supply three-phase power at the source frequency to the three-phase load, C is a circuit of capacitors connected in three-phase relationship (hereinafter, it is called a three-phase capacitor), and SR is a circuit of saturable reactors connected in three-phase relationship (hereinafter, it is called as three-phase saturable reactor). Also, $X_C$, $Y_C$, and $Z_C$ are input terminals of the three-phase capacitor C, $X_L$, $Y_L$, and $Z_L$ are input terminals of the three-phase saturable reactor, and the three-phase capacitor C and the three-phase saturable reactor SR are connected in parallel at points X′, Y′ and Z′, and points X′, Y′ and Z′ are connected to appropriate points X, Y and Z in windings of the linear reactors 1, 2 and 3, respectively.

Figure 2:
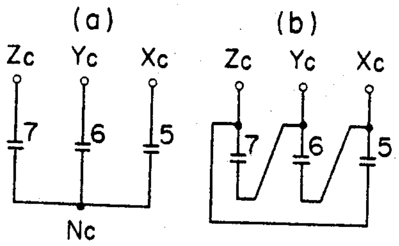
Figure 3A:
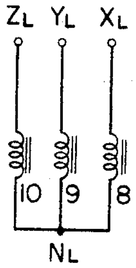
Figure 3B:
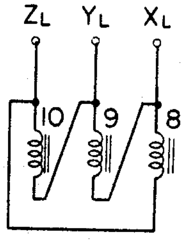
Figure 3C:
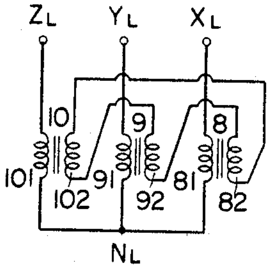
Figure 3D:
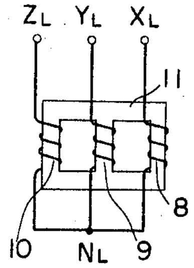
Figure 3E:
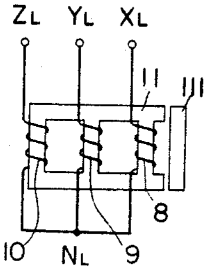
Figure 3F:
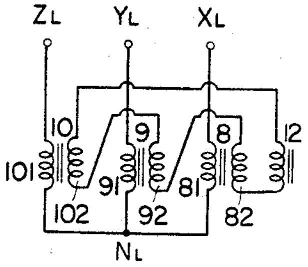
Figure 3G:
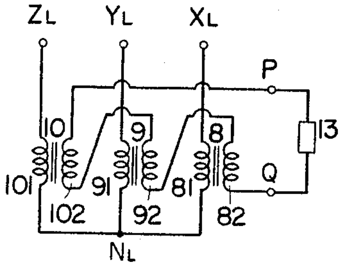
Figure 3H:
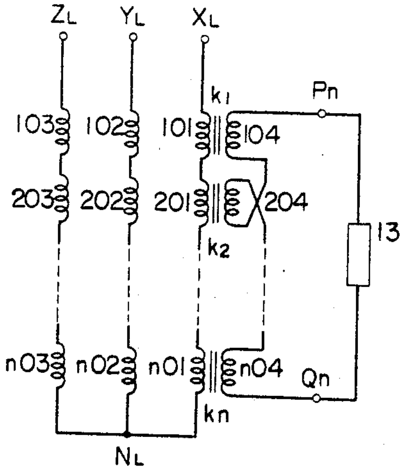

The three-phase capacitor C, as shown in FIGS. 2*a* and 2*b*, is composed of three capacitors 5, 6 and 7 connected in star or delta. Also the three-phase saturable reactor SR is connected as shown in FIGS. 3*a*–3*i*. FIG. 3*a* shows the case where the three saturable reactors 8, 9 and 10 are star-connected, $N_L$ being a neutral point of the star-connection. FIG. 3*b* shows the case where the three saturable reactors 8, 9 and 10 are delta-connected. FIG. 3*c* shows the case where primary windings 81, 91 and 101 of the saturable reactors 8, 9 and 10 are star-connected, while secondary windings 82, 92 and 102 are delta-connected. FIG. 3*d* shows the case where the three saturable reactors 8, 9 and 10 are star-connected, while each phase winding is wound on a respective leg of a three-leg core 11. FIG. 3*e* shows the case where a by-pass magnetic leg, that is, a fourth leg 111 is added to the three-leg core 11 with a small air gap between them. FIG. 3*f* shows the case where the linear reactor 12 is connected in series in the delta-connection circuit of the secondary windings of the same circuit arrangement as that of FIG. 3*c* to obtain the same effect as with the by-pass magnetic leg 111 shown in FIG. 3*e*. FIG. 3*g* shows the case where the delta-connection of the secondary windings in the same circuit arrangement as of FIG. 3*c* is opened, the load 13 is connected between its output terminals P and Q, and an electric power having frequency three times that of the source frequency is supplied to the load 13. In FIG. 3*h* and *i*, three sets of exciting windings 101–*no*1, 102–*no*2 and 103–*no*3 connected in series are star- or delta-connected, and those three sets of exciting windings are excited from phases R, S and T of the electric source respectively, and, the exciting windings 101, 102 and 103 are wound on the same core $k_1$, and so are the other exciting windings. 104–*no*4 are output windings of the saturable reactors, and are connected in series but in reverse polarity between output terminals P*n* and Q*n* and supply electric power having frequency $n$ times the source frequency to load 13 connected to the output terminals P*n* and Q*n*, wherein *n* is any odd number.

Figure 1B:
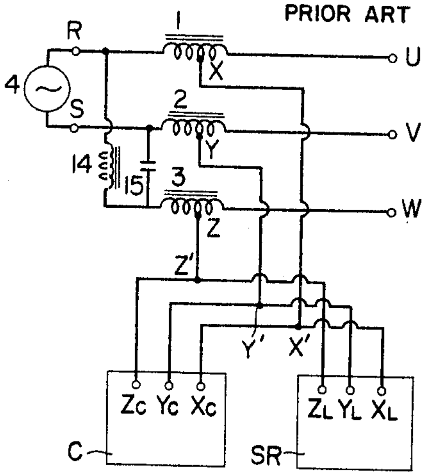
FIG. 1b PRIOR ART

Further, the circuit shown in FIG. 1*b* is to supply power from a single-phase electric source to a three-phase load, wherein 1, 2 and 3 are linear reactors, 4 is a single-phase electric source, R and S are source terminals, U, V and W are the output terminals to supply three-phase electric power of the source frequency to the load. In this case, the connection of the three-phase capacitor C and the three-phase saturable reactor SR is similar to FIG. 1. The linear reactor 14 and the capacitor 15 connected in series are connected across the terminals R and S, and the linear reactor 3 is connected to the connection point of the linear reactor 14 and capacitor 15. Further, the linear reactor 14 and the capacitor 15 constitute a phase shifting circuit, causing three-phase excitation from the single-phase electric source 4 to the three-phase saturable reactor SR.

Figure 1C:
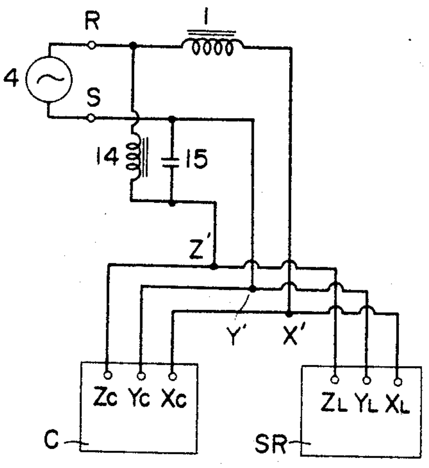
FIG. 1c PRIOR ART

The circuit shown in FIG. 1*c* is to supply power from a single-phase electric source at an output frequency which is a multiple of the source frequency, wherein only the linear reactor 1 is connected to the circuit of the phase R. The conductor corresponding to the phase T is connected to the connection point of the linear reactor 14 and the capacitor 15, and the linear reactor 14 and the capacitor 15 constitute a phase shifting circuit as in the case of FIG. 1*b*.

Figure 1D:
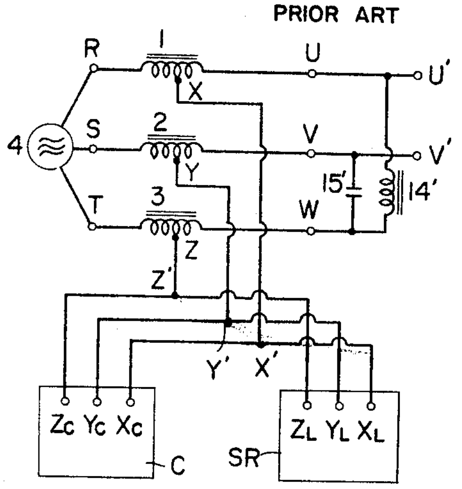
FIG. 1d PRIOR ART

The circuit shown in FIG. 1*d* is to supply power from a three-phase alternating current source to a single-phase load, wherein U′ and V′ are the output terminals to supply single-phase electric power of the source frequency to the single-phase load, and the linear reactor 14′ and the condenser 15′ constitute the phase shifting circuit.

Figure 3I:
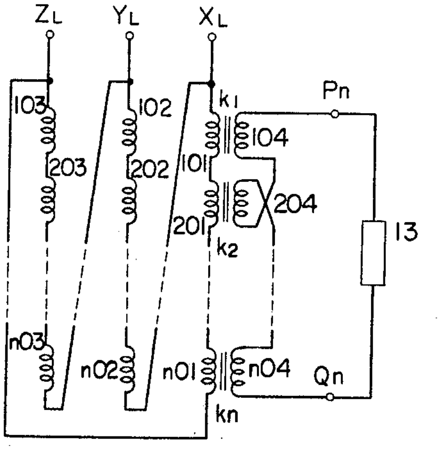

In the case of circuits shown in FIGS. 1*a*–1*d*, it is possible to take out an output having a frequency three times the source frequency out of the output terminals P and Q when the three-phase saturable reactor SR is composed as shown in FIG 3*g* to form a frequency multipler for multiplying the frequency three times, and to take out an output having a frequency *n* times the source frequency out of the output terminals P*n* and Q*n* when the three-phase saturable reactor SR is composed as shown in FIGS. 3*h* and 3*i*.

Figure 4:
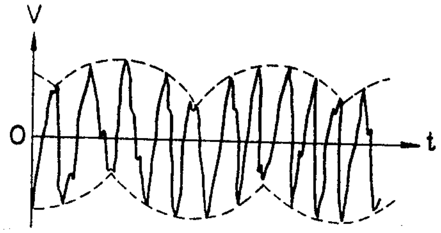
FIG. 4 shows a voltage wave form between input terminals of the three-phase saturable reactor showing the state of low frequency oscillation which occurs occasionally in the circuit shown in FIGS. 1*a*–1*d*.

However, in all the devices having circuit arrangements as shown in FIGS. 1*a*–1*d*, the wave forms of the saturable reactor exciting voltage (voltage between input terminals) are distorted as shown in FIG. 4, when the source voltage rises, and occasionally there occurs a low frequency oscillation voltage of several cycles per second, and therefore a stable operation is not obtained. It is difficult to manufacture the device which does not have this fault when using only the circuit arrangements shown in FIGS. 1*a*–1*d*, and it is not possible to avoid the disadvantage of slow transient response, even if the device is carefully manufactured.

Figure 5:
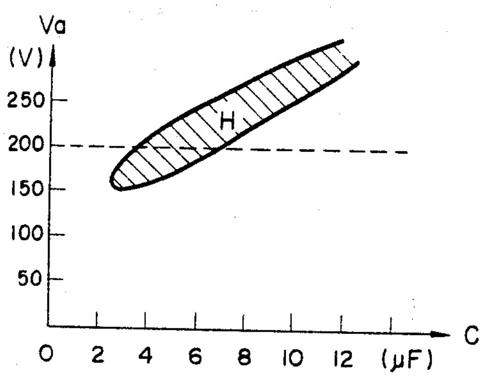
FIG. 5 is a graph showing a region by Hr wherein low frequency oscillation shown in FIG. 4 occurs.
Figure 6:
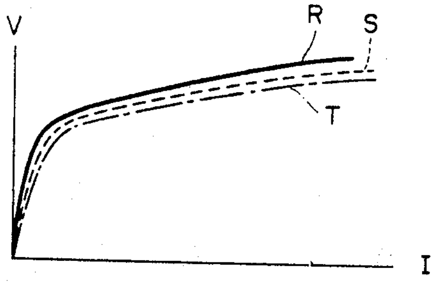
FIG. 6 shows characteristic curves of exciting current against terminal voltage, showing an irregularity of the exciting current of each phase of the three-phase saturable reactor.

The inventors of the present invention made many experiments to examine the conditions under which the low frequency oscillation occurred, and on the basis of the result the inventors found, as shown in FIG. 5, an unstable region H, in which occurs low frequency oscillation. That is, in FIG. 5 the unstable region H is indicated by an oblique lined portion, while the two coordinates are capacity of the capacitors 5, 6 and 7 (FIG. 2) and the effective value V*a* of source line voltage. As the result of experiments and theoretical analysis, it became clear that the unstable region H expands if the third harmonic current is large, owing to the inequality of the exciting current of each phase of the three-phase saturable reactor SR, and the unstable region H contracts if the third harmonic current is small. FIG. 6 shows curves showing an example of the inequality of the exciting current, in which the ordinate is the input terminal voltage V of the three-phase saturable reactor, whereas the abscissa is the exciting current I of each phase. However, the following became clear: that is, no matter how small the inequality was made in a steady state such as constant load and constant voltage, inequality occurs transiently at the instant of connecting the source voltage to the device or when a sudden change occurs therein, and it causes a low frequency component in the output voltage, which does not diminish for a long period extending over ten-odd or even several tens of cycles, so that transient response is greatly impeded.

FIG. 7 shows a principal part of an embodiment of the present invention, in which a three-phase filter F, which short-circuits the third harmonics, is connected to the circuit arrangement shown in FIGS. 1*a*–1*d*. In FIG. 7, $X_C$, $Y_C$ and $Z_C$ are the input terminals of the three-phase capacitor C shown in FIGS. 1*a*–1*d*, $X_L$, $Y_L$ and $Z_L$ are the input terminals of the three-phase saturable reactor SR, and points X′, Y′ and Z′ are the connection points of the capacitor and saturable reactor. It is noted that in the present invention, the connection of the three-phase saturable reactor is that shown in FIGS. 3*h* or 3*i*.

In the present invention, the three-phase filter F, which short-circuits the third harmonics, is connected to the parallel connection points X′, Y′ and Z′ of the three-phase capacitor C and the three-phase saturable reactor SR, while the neutral point of the filter F is not connected to the neutral point of the three-phase saturable reactor SR. As shown in FIGS. 8*a* and 8*b*, the filter F is made of a star- or delta-connection of the capacitors 16, 17 and 18 and the linear reactors 19, 20 and 21 which are connected in series with the capacitors, respectively. This series-connected (for example, 16–19, 17–20 and 18–21, respectively) circuit is made so as to resonate with respect to the third harmonics. And in the case of the star-connection shown in FIG. 8*a*, the neutral point of the filter F is NF. Also, as to the three-phase saturable reactor SR, in the case of star-connection as in FIG. 3*h*, its neutral point is $N_L$. In the present invention, when both the filter F and the three-phase saturable reactor SR are star-connected, the respective neutral points N*f* and $N_L$ are not connected, whereas if either the filter F or a three-phase saturable reactor SR or both of them are delta-connected, it is clear that the neutral points cannot be connected since there is no real neutral point in either. However, in the following description the explanation is made as if the neutral points did exist in both the three-phase filter F and the three-phase saturable reactor SR. (The neutral points N*f* and $N_L$ are real neutral points in the case of a star-connection, whereas they are nothing but theoretical neutral points in the case of a delta-connection.) As mentioned above, in the present invention, since the neutral point N*f* of the three-phase filter F and the neutral point $N_L$ of the three-phase saturable reactor SR are not connected, only the third harmonics current resulting from the unequality of the exciting current of each phase of the three-phase reactor SR is short-circuited by this three-phase filter. Consequently, the third harmonic current does not flow in the linear reactors 1, 2 and 3 shown in FIG. 1 (in the case of FIG. 1*c*, the linear reactor 1) or in the electric source 4. On the contrary to the present invention, if the neutral point N*f* of the three-phase filter F and the neutral point $N_L$ of the three-phase saturable reactor SR were connected, third harmonic voltages contained in voltages between terminals of respective phases of the three-phase saturable reactor SR and the neutral point, that is, the voltages between $X_LN_L$, $Y_LN_L$ and $Z_LN_L$ would be short-circuited by the three-phase filter F, consequently the third harmonic current flowing in the three-phase filter F would, of course, become remarkably large. And further the output voltage in the frequency multiplier circuit (for example voltage between P and Q in FIG. 3*g*) becomes null.

But, in the present invention, since the neutral points $N_L$ and N*f* are not connected, only the third harmonics component, which exists between the input terminals of the three-phase saturable reactor SR (said third harmonics component is substantially proportional to the inequality of the exciting current of each phase of the three-phase saturable reactor SR) is short-circuited, thus the voltage between the terminals of each phase of the three-phase saturable reactor SR and the neutral point, that is, the most part of the third harmonics voltage contained in voltages between $X_LN_L$, $Y_LN_L$ and $Z_LN_L$, cancel each other between $X_LN_L$ and $Y_LN_L$, $Y_LN_L$ and $Z_LN_L$ and $X_LN_L$, and does not appear at the terminals $X_L—Y_L$, $Y_L—Z_L$ and $Z_L—X_L$, and thus the third harmonic currents are not short-circuited by the three-phase filter F. Consequently, the disadvantage which would occur if the neutral point $N_L$ of the three-phase saturable reactor SR were connected to the neutral point $N_f$ of the three-phase filter F, does not occur. Thus in this invention the following results of experiments have been obtained. By connecting the filter F as shown in FIG. 7, the unstable region H, in which low frequency oscillation as shown in FIG. 5 occurs, has been made to completely disappear, whereby the time necessary for stabilizing the output voltage, even at the instant of connection of the source voltage or when a sudden change occurs, is shortened to about 1–2 cycles of the source frequency.

FIG. 9 is a circuit diagram for the connection of the present invention to the circuit shown in FIG. 1*a*. However, there are many circuits as shown in FIGS. 1*b*–1*d* depending on the combinations of the linear reactors 1, 2 and 3, the three-phase saturable reactor SR and the three-phase capacitor C. Therefore, the three-phase filter F can be connected in parallel to the parallel connection points X′, Y′ and Z′ of the three-phase saturable reactor SR and the three-phase capacitor C, to form various other embodiments of the present invention.

Further, FIG. 10 shows a modified embodiment of the present invention. That is, in the embodiment shown in FIG. 10, the linear reactors 19, 20 and 21 (shown in FIGS. 8*a* and 8*b*) in the three-phase filter F, are replaced by the secondary windings 1″, 2″ and 3″ of the linear reactors 1, 2 and 3. Though it is not illustrated, these secondary windings 1″, 2″ and 3″ may also be composed so as to contain a part of the primary windings of the linear reactors 1, 2 and 3 therein. It has been confirmed by experiments that in this case, too, the unstable region H shown in FIG. 5 in which low frequency oscillation occurs, disappears and the transient response occurs in from 1–2 cycles of the source frequency.

It is, of course, also possible to use the three-phase filter shown by F in FIG. 9, and three capacitors of the three-phase filter shown by the capacitors 16, 17 and 18 in FIG. 10 as the capacitors for parallel resonance (shown as 5, 6 and 7 in FIG. 2).

As above mentioned, the present invention is the first to complete a three-phase parallel type ferro-resonance device, which is easy to manufacture and has a high efficiency, and is especially useful in providing a higher order frequency multiplier.

What we claim is:

1. A three-phase parallel type ferro-resonance frequency multiplier device, which consists of at least one linear reactor, a three-phase saturable reactor and a three phase capacitor, said three-phase saturable reactor being composed of three sets of *n* saturable reactor exciting windings and *n* common magnetic cores, the corresponding exciting windings of each phase being wound on a common magnetic core and the *n* exciting windings of each phase being connected in series, the three sets of series connected exciting windings being connected in three-phase relationship, and *n* output windings, one on each common core, and being connected in series with every other output winding being in reverse polarity, whereby there is generated between output terminals of said series of output windings a single-phase voltage having a frequency *n* times the frequency of an input voltage to said device, one end of each set of series connected saturable reactor exciting windings being connected in parallel to a corresponding phase of said three-phase capacitor, a three-phase filter having three input terminals, said three-phase saturable reactor being connected in parallel to the input terminals of said three-phase filter, each phase of said filter being composed of a series connected circuit of a linear reactor and a capacitor and which resonates at the third harmonics of the source frequency, the neutral point of said three-phase filter and the neutral point of said three-phase saturable reactor being electrically unconnected.

References Cited

UNITED STATES PATENTS

| | | | |
|---|---|---|---|
| 2,437,093 | 3/1948 | Huge | 321—68 |
| 3,205,430 | 9/1965 | Tango et al. | 323—76 |
| 3,214,681 | 10/1965 | Tango et al. | 323—76 |
| 3,263,148 | 7/1966 | Biringer | 321—7 |
| 3,264,549 | 8/1966 | Biringer | 321—68 |

MILTON O. HIRSHFIELD, *Primary Examiner.*

WARREN E. RAY, *Examiner.*